United States Patent
Liu

(10) Patent No.: US 10,331,120 B2
(45) Date of Patent: Jun. 25, 2019

(54) REMOTE CONTROL DEVICE, CONTROL SYSTEM AND METHOD OF CONTROLLING

(71) Applicant: SZ DJI TECHNOLOGY CO., LTD., Shenzhen (CN)

(72) Inventor: Yuancai Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 222 days.

(21) Appl. No.: 15/355,812

(22) Filed: Nov. 18, 2016

(65) Prior Publication Data
US 2017/0068242 A1    Mar. 9, 2017

Related U.S. Application Data

(63) Continuation of application No. PCT/CN2014/077992, filed on May 21, 2014.

(51) Int. Cl.
*G05D 1/00* (2006.01)
*B64C 39/02* (2006.01)
*G06F 3/0346* (2013.01)

(52) U.S. Cl.
CPC ......... *G05D 1/0016* (2013.01); *B64C 39/024* (2013.01); *G06F 3/0346* (2013.01);
(Continued)

(58) Field of Classification Search
CPC .... G05D 1/0016; G05D 1/101; B64C 39/024; B64C 2201/123; B64C 2201/146; G01D 1/08; G06F 3/0346
See application file for complete search history.

(56) References Cited

U.S. PATENT DOCUMENTS

2012/0095575 A1   4/2012   Meinherz et al.
2012/0232718 A1*  9/2012   Rischmuller .......... A63H 27/12
                                                     701/2
(Continued)

FOREIGN PATENT DOCUMENTS

CN    101667032 A    3/2010
CN    201516793 U    6/2010
(Continued)

OTHER PUBLICATIONS

The Japan Patent Office (JPO) Rejection Assessment for 2016-563157 dated Jul. 25, 2017 7 Pages.
(Continued)

*Primary Examiner* — Hussein Elchanti
(74) *Attorney, Agent, or Firm* — Anova Law Group, PLLC

(57) ABSTRACT

A remote control device for remotely controlling an unmanned apparatus and a carried object carried by the unmanned apparatus includes a remote control device attitude sensor and a microprocessor. The remote control device attitude sensor is configured to detect a remote control device spatial attitude of the remote control device and output a remote control device spatial attitude signal according to the remote control device spatial attitude. The microprocessor is configured to receive the remote control device spatial attitude signal, calculate an angle change of the remote control device in a remote control device dimension based on the remote control device spatial attitude signal, and generate a carried object control signal for controlling a movement of the carried object in a corresponding dimension based on the angle change of the remote control device. The corresponding dimension corresponds to the remote control device dimension.

18 Claims, 2 Drawing Sheets

(52) U.S. Cl.
CPC .. *B64C 2201/123* (2013.01); *B64C 2201/127* (2013.01); *B64C 2201/14* (2013.01); *B64C 2201/146* (2013.01)

(56) References Cited

U.S. PATENT DOCUMENTS

| | | | | |
|---|---|---|---|---|
| 2013/0176423 A1* | 7/2013 | Rischmuller | ........ | G05D 1/0038 348/114 |
| 2013/0206915 A1* | 8/2013 | Desaulniers | .......... | B64C 39/024 244/165 |
| 2014/0099853 A1* | 4/2014 | Condon | ............... | G05D 1/0033 446/37 |
| 2014/0138477 A1* | 5/2014 | Keennon | ................ | B64C 27/12 244/17.23 |
| 2014/0249693 A1* | 9/2014 | Stark | ..................... | B64C 39/024 701/2 |
| 2015/0031345 A1* | 1/2015 | Hyde | ..................... | H01Q 1/241 455/418 |
| 2015/0149000 A1* | 5/2015 | Rischmuller | ........ | B64C 39/024 701/7 |
| 2016/0132052 A1* | 5/2016 | Seydoux | .............. | G05D 1/0022 701/2 |
| 2016/0137293 A1* | 5/2016 | Santangelo | ........... | B64C 39/024 244/50 |
| 2016/0139596 A1* | 5/2016 | Na | ......................... | G08C 17/02 701/2 |
| 2016/0200438 A1* | 7/2016 | Bokeno | ................ | B64C 39/024 244/2 |
| 2016/0214713 A1* | 7/2016 | Cragg | ................... | B64C 39/024 |
| 2016/0214715 A1* | 7/2016 | Meffert | ................ | B64C 39/024 |
| 2016/0274582 A1* | 9/2016 | Banda | ................... | B64C 39/024 |
| 2016/0306351 A1* | 10/2016 | Fisher | .................... | H04W 4/70 |

FOREIGN PATENT DOCUMENTS

| | | |
|---|---|---|
| CN | 202120126 U | 1/2012 |
| CN | 103218061 A | 7/2013 |
| CN | 103342165 A | 10/2013 |
| CN | 103426282 A | 12/2013 |
| CN | 103713746 A | 4/2014 |
| EP | 2613214 A1 | 7/2013 |
| JP | H0585371 A | 4/1993 |
| JP | H05286497 A | 11/1993 |
| JP | H06190144 A | 7/1994 |
| JP | H1199284 A | 4/1999 |
| JP | 2000024333 A | 1/2000 |
| JP | 2006110239 A | 4/2006 |
| JP | 2006338483 A | 12/2006 |
| JP | 2007050490 A | 3/2007 |
| JP | 2007142993 A | 6/2007 |
| JP | 2013139256 A | 7/2013 |
| WO | WO-2015014116 A1 * | 2/2015 ........... B64C 39/024 |

OTHER PUBLICATIONS

The World Intellectual Property Organization (WIPO) International Search Report for PCT/CN2014/077992 dated Feb. 26, 2015 p. 1-6.

* cited by examiner

US 10,331,120 B2

REMOTE CONTROL DEVICE, CONTROL SYSTEM AND METHOD OF CONTROLLING

CROSS-REFERENCE TO RELATED APPLICATION

This is a continuation application of International Application No. PCT/CN2014/077992, filed on May 21, 2014, the entire contents of which are incorporated herein by reference.

TECHNICAL FIELD

The present disclosure relates to unmanned apparatus and, more particularly, to a remote control device, a control system, and a method of controlling.

BACKGROUND

Unmanned apparatus (i.e., unpiloted moving objects), including aircrafts (for example, fixed wing aircrafts, rotor wing aircrafts such as helicopters), motor vehicles, submarines or ships, and satellites, space stations, or spacecraft, have been developed for a wide range of applications including exploration, rescue operations and other fields. Objects such as cameras can be carried on the moving objects.

A user can manipulate a moving object and carried object thereon with a remote control device. The remote control device can control a movement of an aircraft in four moving dimensions (e.g., front and back, left and right, up and down, and orientation) with two joysticks. A control of a carried object of the moving object in three moving dimensions (e.g., yaw, pitch, and roll) can be implemented with another remote control device. Therefore, two remote control devices (e.g., four joysticks) are needed to control a movement of an aircraft in four dimensions and a movement of a carried objected in three dimensions. The control thus has to be implemented by a cooperation of two persons instead of one (because a person only has two hands). In particular, in the field of aerial photography, perfect cooperation of two operators is a key for excellent works, which can increase a complexity and reduce an efficiency in controlling.

SUMMARY

The present disclosure provides a remote control device, a control system, and a method of controlling. The present disclosure can solve the problem in existing remote control devices that one person could not simultaneously control an unmanned apparatus and a carried object since the object carried by the unmanned apparatus has to be controlled by a joystick.

According to one aspect of the disclosure, there is provided remote control device for remotely controlling an unmanned apparatus and a carried object carried by the unmanned apparatus. The remote control device includes a remote control device attitude sensor and a microprocessor. The remote control device attitude sensor is configured to detect a remote control device spatial attitude of the remote control device and output a remote control device spatial attitude signal according to the remote control device spatial attitude. The microprocessor configured to receive the remote control device spatial attitude signal, calculate an angle change of the remote control device in a remote control device dimension based on the remote control device spatial attitude signal, and generate a carried object control signal for controlling a movement of the carried object in a corresponding dimension based on the angle change of the remote control device. The corresponding dimension corresponds to the remote control device dimension.

In some embodiments, the carried object control signal is configured to control the carried object to move a predetermined angle in the corresponding dimension or to move at a predetermined velocity in the corresponding dimension.

In some embodiments, the remote control device spatial attitude of the remote control device includes at least one of an angle of the remote control device in a yaw direction, an angle of the remote control device in a pitch direction, or an angle of the remote control device in a roll direction.

In some embodiments, the carried object control signal is configured to control a movement of the carried object such that an angle change of the carried object in the corresponding dimension is proportional to the angle change of the remote control device in the remote control device dimension.

In some embodiments, the remote control device further includes a joystick. The microprocessor is further configured to generate, based on a movement of the joystick in a control direction, an unmanned apparatus control signal for controlling a movement of the unmanned apparatus in a corresponding direction, the corresponding direction corresponding to the control direction.

In some embodiments, the unmanned apparatus control signal is further configured to control the unmanned apparatus to maintain a state in the corresponding direction when the joystick is maintained at a predetermined position in the control direction.

In some embodiments, the unmanned apparatus control signal is further configured to control the unmanned apparatus to maintain an original moving velocity in the corresponding direction or to decelerate and enter into a hovering state.

In some embodiments, the remote control device further includes a control switch configured to control at least one of the remote control device attitude sensor or the microprocessor to activate or deactivate a control of the remote control device over the carried object.

In some embodiments, the remote control device spatial attitude signal is a subsequent remote control device spatial attitude signal output from the remote control device attitude sensor after a control of the remote control device over the carried object is activated. The microprocessor is further configured to record an initial remote control device spatial attitude signal when the control of the remote control device over the carried object is activated, and calculate the angle change of the remote control device by comparing the subsequent remote control device spatial attitude signal with the initial remote control device spatial attitude signal.

According to another aspect of the disclosure, there is provided a control system for controlling a movement of an unmanned apparatus and a carried object carried by the unmanned apparatus. The control system includes a remote control device consistent with the disclosure, an unmanned apparatus attitude sensor carried by the unmanned apparatus and configured to detect an unmanned apparatus spatial attitude of the unmanned apparatus and generate an unmanned apparatus spatial attitude signal according to the unmanned apparatus spatial attitude for controlling the unmanned apparatus, a carried object attitude sensor carried by the unmanned apparatus and configured to detect a carried object spatial attitude of the carried object and generate a carried object spatial attitude signal according to the carried object spatial attitude for controlling the carried object, an unmanned apparatus controller carried by the unmanned apparatus and configured to control a movement of the unmanned apparatus based on an unmanned apparatus control signal generated by the remote control device for controlling a movement of the unmanned apparatus and the unmanned apparatus spatial attitude signal, and a carried object controller carried by the unmanned apparatus and configured to control a movement of the carried object based on the carried object control signal and the carried object spatial attitude signal.

In some embodiments, the control system further includes an unmanned apparatus manipulating interface configured to drive the unmanned apparatus to perform a movement adjustment. The unmanned apparatus controller, the unmanned apparatus attitude sensor, and the unmanned apparatus manipulating interface form a feedback closed-loop for maintaining a state of the unmanned apparatus.

According to another aspect of the disclosure, there is provided a method for controlling an unmanned apparatus and a carried object carried by the unmanned apparatus. The method includes receiving an unmanned apparatus control signal generated by a microprocessor of a remote control device based on a movement of a joystick in a control direction, controlling a movement of the unmanned apparatus in a corresponding direction corresponding to the control direction based on the unmanned apparatus control signal, detecting a remote control device spatial attitude of the remote control device by a remote control device attitude sensor of the remote control device and outputting a remote control device spatial attitude signal according to the remote control device spatial attitude, calculating, by the microprocessor, an angle change of the remote control device in a remote control device dimension based on the remote control device spatial attitude signal, generating a carried object control signal based on the angle change, and controlling a movement of the carried object in a corresponding dimension based on the carried object control signal. The corresponding dimension corresponds to the remote control device dimension.

In some embodiments, controlling the movement of the carried object in the corresponding dimension includes controlling the carried object to move a predetermined angle in the corresponding dimension or controlling the carried object to move at a predetermined velocity in the corresponding dimension.

In some embodiments, detecting the remote control device spatial attitude includes detecting at least one of an angle of the remote control device in a yaw direction, an angle of the remote control device in a pitch direction, or an angle of the remote control device in a roll direction.

In some embodiments, controlling the movement of the carried object includes controlling the carried object such that an angle change of the carried object in the corresponding dimension is proportional to the angle change of the remote control device in the remote control device dimension.

In some embodiments, the method further includes controlling the unmanned apparatus to maintain a state in the corresponding direction when the joystick is maintained at a predetermined position in the control direction.

In some embodiments, maintaining the state includes controlling the unmanned apparatus to maintain an original moving velocity in the corresponding direction or to decelerate and enter into a hovering state.

In some embodiments, the method further includes controlling, by a control switch of the remote control device, at least one of the remote control device attitude sensor or the microprocessor of the remote control device to activate or deactivate a control of the remote control device over the carried object.

With the remote control device of present disclosure, an angle change of the remote control device in at least one dimension can be calculated by sensing a spatial attitude of the remote control device, and a carried object control signal for controlling a movement of the carried object carried by the unmanned apparatus in a corresponding dimension can be generated based on the angle change of the remote control device. With the remote control device of present disclosure, a movement of the unmanned apparatus in four dimensions and a movement of the carried object carried by the unmanned apparatus in three dimensions can be simultaneously controlled by one operator. Therefore, the prior art problem of not capable of simultaneously controlling the unmanned apparatus and the carried object by one person, with the carried objected being controlled with joysticks, can be solved. With the remote control device provided by the present disclosure, a complexity in controlling the unmanned apparatus and the carried object can be reduced, and a control efficiency and control effect can be improved.

DETAILED DESCRIPTION OF EMBODIMENTS

It will be appreciated that, the unmanned apparatus as described in the embodiments of the present disclosure can comprise, but not limited to, aircrafts (for example, fixed wing aircrafts, rotor wing aircrafts such as helicopter), motor vehicles, submarines or ships, and satellites, space stations, or space crafts and so on. The carried object on the unmanned apparatus can comprise, but not limited to, gimbals and cameras, video cameras, telescopes, remote video cameras, measuring instruments and so on which are disposed on the gimbal. An unmanned apparatus controller and a carried object controller provided on the unmanned apparatus can fix an imaging device, and adjust an attitude of the imaging device (for example, changing the inclination angle and imaging direction of the imaging device) with the gimbal, in order to implement a high quality video and/or picture imaging. It will be appreciated that, the unmanned apparatus controller and the carried object controller can directly control a movement of the unmanned apparatus and the carried object without the gimbal.

Figure 1:
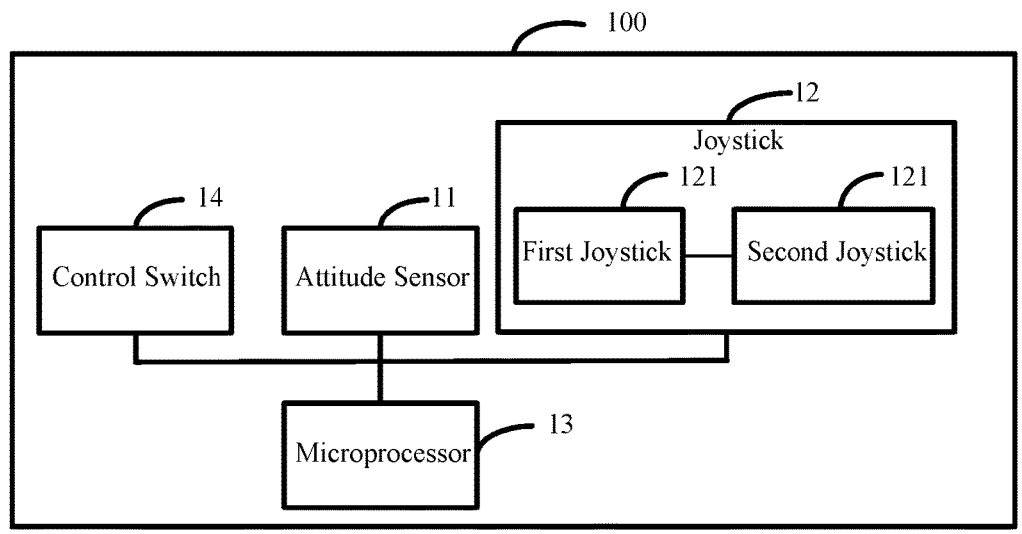
FIG. 1 is a schematic view of a remote control device according to an embodiment of the present disclosure.

FIG. 1 is a schematic view of a remote control device according to an embodiment of the present disclosure. The remote control device 100 of the embodiment can be used to remotely control an unmanned apparatus and a carried object thereon. The remote control device 100 of the embodiment can comprise an attitude sensor 11 and a microprocessor 13.

The attitude sensor 11 can detect a spatial attitude of the remote control device 11 and output a spatial attitude signal, and is thus also referred to as a "remote control device attitude sensor." The spatial attitude of the remote control device 11 is also referred to as a "remote control device spatial attitude," and the spatial attitude signal is also referred to as a "remote control device spatial attitude signal."

In some instances, the attitude sensor 11 can be at least one of a gyroscope or an accelerometer. Optionally, the attitude sensor 11 can be an inertial measurement unit.

The spatial attitude of the remote control device 100 can comprise angles of the remote control device 100 in three dimensions, also referred to as "remote control device dimensions," including a yaw direction, a pitch direction and a roll direction.

The microprocessor 13 can receive the spatial attitude signal output from the attitude sensor 11, calculate an angle change of the remote control device 100 in at least one dimension, and generate a carried object control signal for controlling a motion of the carried object in a corresponding dimension based on the angle change. The corresponding dimension corresponds to the at least one dimension.

In some instances, the carried object control signal can be used to control the carried object to move a predetermined angle in the corresponding dimension or control the carried object to move at a predetermined velocity in the corresponding dimension.

The angle change of the remote control device 100 in at least one dimension of the three dimensions including the yaw direction, the pitch direction and the roll direction can be used to control an angle change of the carried object in a corresponding dimension. For instance, the angle change of the remote control device 100 in at least one dimension can have a predetermined proportional relation with the angle change of the carried object in a corresponding dimension. In some instances, in case the carried object comprises a triaxial gimbal and an imaging device disposed on the gimbal, if the angle change of the remote control device 100 in pitch direction is Δx, then the microprocessor 13 can generate a carried object control signal for controlling the imaging device on the gimbal to move in pitch direction by an angle kΔx based on the angle change Δx, where k is a predetermined constant value. Angle changes of the remote control device 100 in yaw direction and in the roll direction can be used to control moving angles of the carried object in a yaw direction and a roll direction respectively, in a similar way as discussed hereinabove. In this way, the triaxial gimbal can enable a movement of the imaging device on the gimbal in yaw direction, pitch direction and roll direction.

In some embodiments, the angle change of the remote control device 100 in at least one dimension can be used to control a moving velocity of the carried object in a corresponding dimension. For instance, the moving velocity of the carried object in a dimension can have a predetermined proportional relation with the angle change of the remote control device 100 in a corresponding dimension.

Referring to FIG. 1, the remote control device 100 can further comprise a joystick 12. The microprocessor 13 can generate an unmanned apparatus control signal for controlling a movement of the unmanned apparatus in a corresponding direction based on a movement of the joystick 12 in at least one direction. The direction in which the joystick 12 moves is also referred to as a "moving direction" or "control direction," and the corresponding direction, also referred to as a "corresponding moving direction," of the unmanned apparatus corresponds to the control direction.

In some embodiments, the joystick 12 can comprise a first joystick 121 and a second joystick 122. A first unmanned apparatus control signal for controlling a movement of the unmanned apparatus in a first corresponding direction can be generated based on a movement of the first joystick 121 in a first control direction. A second unmanned apparatus control signal for controlling a movement of the unmanned apparatus in a second corresponding direction can be generated based on a movement of the first joystick 121 in a second control direction. A third unmanned apparatus control signal for controlling a movement of the unmanned apparatus in a third corresponding direction can be generated by a movement of the second joystick 122 in a third control direction. A fourth unmanned apparatus control signal for controlling a movement of the unmanned apparatus in a fourth corresponding direction can be generated by a movement of the second joystick 122 in a fourth control direction.

For instance, a movement of the first joystick 121 in an up and down direction can generate an unmanned apparatus control signal for controlling a movement of the unmanned apparatus in the up and down direction. A movement of the first joystick 121 in a left and right direction can generate an unmanned apparatus control signal for controlling an orientation of the unmanned apparatus. A movement of the second joystick 122 in a front and back direction and a movement of the second joystick 122 in the left and right direction can generate unmanned apparatus control signals for controlling translational movements of the unmanned apparatus in the front and back direction and in the left and right direction, respectively. It will be appreciated that, the described correspondence between movements of the joystick and control signals for the unmanned apparatus is for illustrative purpose, and any other correspondence is possible if the technical objects of the present disclosure can be achieved.

If the joystick 12 maintains at a predetermined position in a moving direction due to a removal of an external force, the unmanned apparatus can be controlled by an unmanned apparatus control signal, which is generated by the microprocessor 13, to enter into a state maintaining in a corresponding direction.

The state maintaining as described can include maintaining an original moving velocity in a corresponding direction, or decelerating and entering into a hovering state.

For instance, if an external force applied on the joystick 12 in a control direction is removed, the unmanned apparatus can be controlled by an unmanned apparatus control signal thus generated to enter into a decelerating state in a corresponding direction. If the joystick 12 is maintained at a predetermined position in the control direction, the unmanned apparatus can be controlled by an unmanned apparatus control signal thus generated to reduce a velocity of the unmanned apparatus in the corresponding direction to zero and keep the zero velocity state. If all the joystick 12 automatically returns to a predetermined position due to a removal of external forces in all directions, the unmanned apparatus can be controlled by an unmanned apparatus control signal thus generated to enter into a hovering state.

In some embodiments, the remote control device 100 can comprise a control switch 14. The control switch 14 can control the attitude sensor 11 and/or the microprocessor 13 so as to turn on or turn off a control of the remote control device 100 over the carried object. If the control switch 14 turns off a control of the remote control device 100 over the carried object, the carried object can maintain at a state of a time immediately before the control switch 14 turns off the control of the remote control device 100. It will be appreciated that, if the control switch 14 turns off a control of the remote control device 100 over the carried object, the carried object can return to its initial state.

In some embodiments, the microprocessor 13 can record a spatial attitude signal output from the attitude sensor 11 as an initial spatial attitude signal, also referred to as an "initial remote control device spatial attitude signal," when a control function of the remote control device 100 over the carried object is turned on, and calculate an angle change of the remote control device 100 in at least one dimension by comparing a subsequent spatial attitude signal, also referred to as a "subsequent remote control device spatial attitude signal," as output from the attitude sensor 11 with the initial spatial attitude signal.

Each time the control function of the remote control device 100 over the carried object is turned on via the control switch 14, the initial state of the remote control device 100 at the time can be recorded as a default state. An angle change of the remote control device 100 can be calculated by comparing a subsequent state of the remote control device 100 as detected with the initial state. Therefore, a control of the remote control device 100 over the carried object can be adaptably adjusted according to an operating style of a different user, thereby avoiding an error in controlling the carried object caused by different operating styles of users.

An angle change of the remote control device in at least one dimension can be calculated by sensing a spatial attitude of the remote control device, and a carried object control signal for controlling a movement of the carried object carried by the unmanned apparatus in a corresponding dimension can be generated based on the angle change of the remote control device. With the remote control device of present disclosure, a movement of the unmanned apparatus in four dimensions and a movement of the carried object carried by the unmanned apparatus in three dimensions can be simultaneously controlled by one operator. Therefore, the problem in existing technologies of not capable of simultaneously controlling the unmanned apparatus and the carried object by one person, with the carried objected being controlled with joysticks, can be solved. With the remote control device provided by the present disclosure, a complexity in controlling the unmanned apparatus and the carried object can be reduced, and a control efficiency and control effect can be improved.

Figure 2:
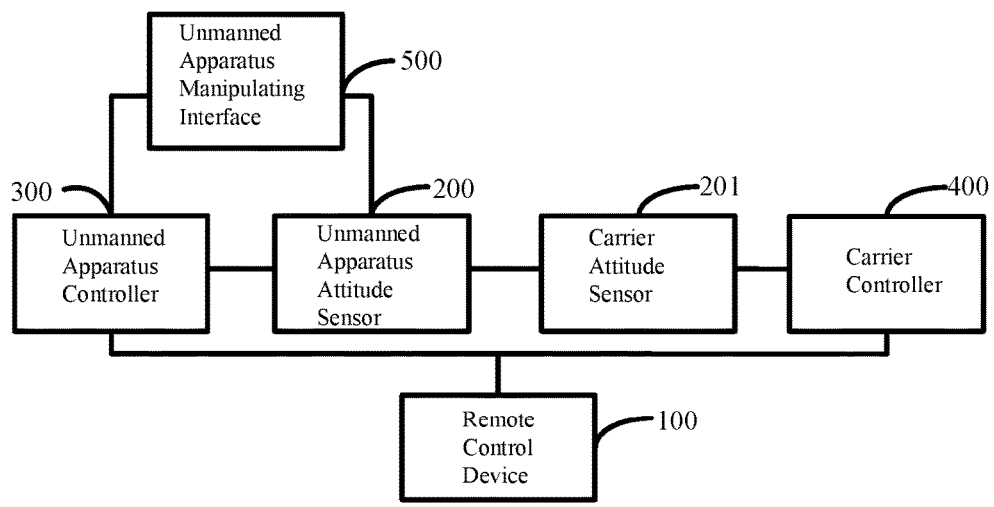
FIG. 2 is a schematic view of a control system according to an embodiment of the present disclosure.

On the basis of the remote control device provided by the present disclosure, the present disclosure further provides a control system for controlling a movement of an unmanned apparatus and a movement of a carried object thereon. Referring to FIG. 2, the control system of the present disclosure comprises the remote control device 100. A structure and a function of the remote control device 100 are described hereinabove. The control system can further comprise a carried object attitude sensor 201 and an unmanned apparatus attitude sensor 200 which are disposed on the unmanned apparatus, an unmanned apparatus controller 300 and a carried object controller 400.

The unmanned apparatus attitude sensor 200 can obtain a spatial attitude of the unmanned apparatus, also referred to as an "unmanned apparatus spatial attitude," and generate a spatial attitude signal for controlling the unmanned apparatus, also referred to as an "unmanned apparatus spatial attitude signal."

The carried object attitude sensor 201 can obtain a spatial attitude of the carried object carried by the unmanned apparatus, also referred to as a "carried object spatial attitude," and generate a spatial attitude signal for controlling the carried object, also referred to as a "carried object spatial attitude signal."

The unmanned apparatus controller 300 can control a movement of the unmanned apparatus based on (1) an unmanned apparatus control signal for controlling a movement of the unmanned apparatus in a corresponding direction, which is generated by the remote control device 100, and (2) the spatial attitude signal for controlling the unmanned apparatus, which is generated by the unmanned apparatus attitude sensor 200.

The carried object controller 400 can control a movement of the carried object based on (1) a carried object control signal, which is generated by the remote control device 100, and (2) the spatial attitude signal for controlling the carried object, which is generated by the carried object attitude sensor 201.

In some embodiments, the control system can comprise an unmanned apparatus manipulating interface 500 for driving the unmanned apparatus to perform a movement adjustment. The unmanned apparatus controller 300, the unmanned apparatus attitude sensor 200 and the unmanned apparatus manipulating surface 500 can form a feedback closed-loop for controlling the unmanned apparatus to maintain the movement.

If the unmanned apparatus enters into a state maintaining in a direction, the unmanned apparatus attitude sensor 200 can monitor a state of the unmanned apparatus in real-time and feed the state back to the unmanned apparatus controller 300, and the unmanned apparatus controller 300 can control the unmanned apparatus manipulating interface 500 to maintain the unmanned apparatus in a state.

The state maintaining described herein can include maintaining an original moving velocity in a corresponding direction, or decelerating and entering into a hovering state.

In case the unmanned apparatus is an aircraft and the carried object is a camera, the state maintaining can comprise keeping a flight altitude of the aircraft and a focal length of the camera unchanged.

Figure 3:
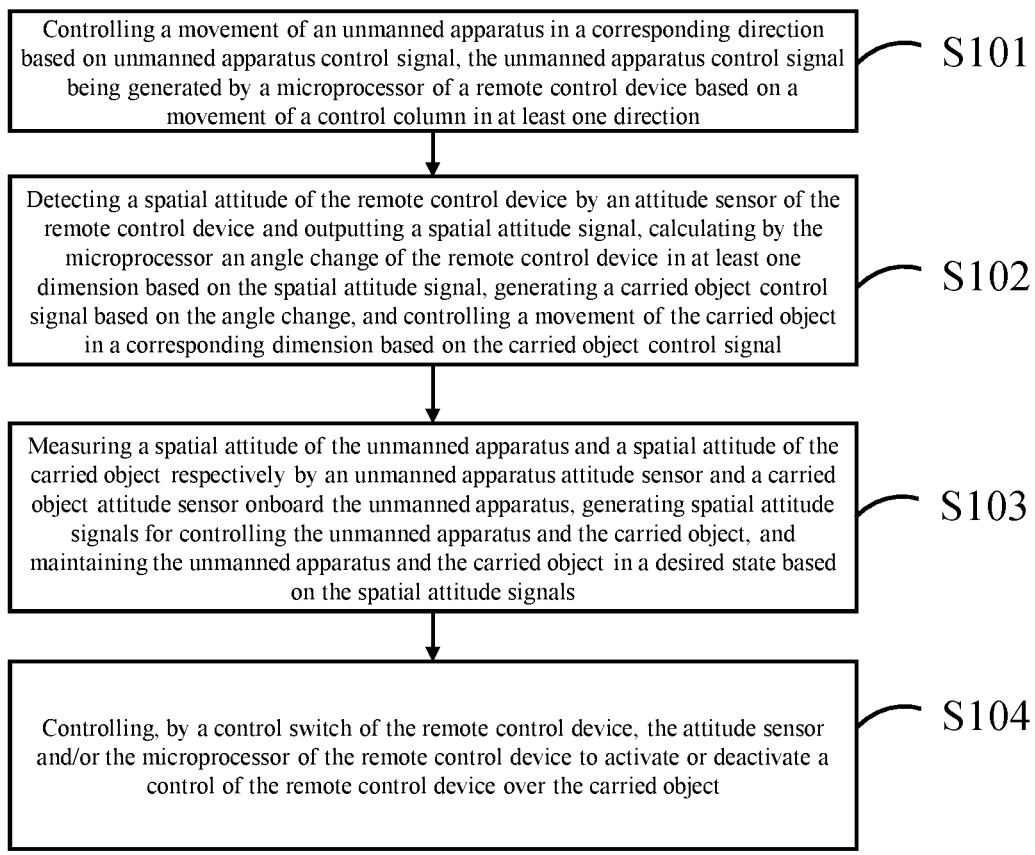
FIG. 3 is a flowchart of a method of controlling an unmanned apparatus and a carried object thereon according to an embodiment of the present disclosure.

Referring to FIG. 3, the present disclosure provides a method of controlling an unmanned apparatus and a carried object thereon. The method of controlling of the embodiment can comprise the processes S101 to S104.

In process S101, an unmanned apparatus control signal can be generated by a microprocessor of a remote control device based on a movement of a joystick in at least one direction, and a movement of the unmanned apparatus in a corresponding direction can be controlled with the unmanned apparatus control signal.

In some embodiments, the joystick can comprise a first joystick and a second joystick. A movement of the unmanned apparatus in a first corresponding direction can be controlled by a first unmanned apparatus control signal which is generated by a movement of the first joystick in a first control direction. A movement of the unmanned apparatus in a second corresponding direction can be controlled by a second unmanned apparatus control signal which is generated by a movement of the first joystick in a second control direction. A movement of the unmanned apparatus in a third corresponding direction can be controlled by a third unmanned apparatus control signal which is generated by a movement of the second joystick in a third control direction. A movement of the unmanned apparatus in a fourth corresponding direction can be controlled by a fourth unmanned apparatus control signal which is generated by a movement of the second joystick in a fourth control direction.

For instance, a movement of the unmanned apparatus in an up and down direction can be controlled by a first unmanned apparatus control signal which is generated by a movement of the first joystick in the up and down direction.

An orientation of the unmanned apparatus can be controlled by a second unmanned apparatus control signal which is generated by a movement of the first joystick in a left and right direction. A translational movement of the unmanned apparatus in a front and back direction and a left and right direction can be controlled by a third unmanned apparatus control signal which is generated by a movement of the second joystick in the front and back direction and the left and right direction, respectively. It will be appreciated that, the described correspondence between movements of the joystick and control signals for the unmanned apparatus is for illustrative purpose, and any other correspondence is possible if the technical objects of the present disclosure can be achieved.

When the joystick maintains at a predetermined position in a moving direction due to a removal of an external force, the unmanned apparatus can be controlled by an unmanned apparatus control signal, which is generated by the microprocessor, to enter into state maintaining in a corresponding direction.

The state maintaining as described can include maintaining an original moving velocity in a corresponding direction, or decelerating and entering into a hovering state.

For instance, if an external force applied on the joystick in a control direction is removed, the unmanned apparatus can be controlled by an unmanned apparatus control signal thus generated to enter into a decelerating state in a corresponding direction. If the joystick is maintained at a predetermined position in the control direction, the unmanned apparatus can be controlled by an unmanned apparatus control signal thus generated to reduce a velocity of the unmanned apparatus in the corresponding direction to zero and keep the zero velocity state. If the joystick automatically returns to a predetermined position due to a removal of external forces in all directions, the unmanned apparatus can be controlled by an unmanned apparatus control signal thus generated to enter into a hovering state.

In case the unmanned apparatus is an aircraft and the carried object is a camera, the state maintaining can comprise keeping a flight altitude of the aircraft and a focal length of the camera unchanged.

In process S102, a spatial attitude of the remote control device can be detected and output by an attitude sensor of the remote control device, an angle change of the remote control device in at least one dimension can be calculated by the microprocessor based on the spatial attitude signal, a carried object control signal can be generated based on the angle change, and a movement of a carried object in a corresponding dimension can be controlled with the carried object control signal.

In some instances, controlling the movement of the carried object in the corresponding dimension can comprise controlling the carried object to move a predetermined angle in the corresponding dimension or controlling the carried object to move at a predetermined velocity in the corresponding dimension.

The spatial attitude of the remote control device can comprise angles of the remote control device in three dimensions including the yaw direction, pitch direction and roll direction.

In some instances, controlling the carried object to move a predetermined angle in the corresponding dimension can comprise controlling the carried object such that the angle change of the remote control device in at least one dimension can have a predetermined proportional relation with the angle change of the carried object in a corresponding dimension. For instance, if the angle change of the remote control device in pitch direction is $\Delta x$, the carried object can be controlled to move an angle $k\Delta x$ in pitch direction based on the angle change $\Delta x$, where k is a predetermined constant value. Angle changes of the remote control device in yaw direction and roll direction can be used to control moving angles of the carried object in a yaw direction and a roll direction respectively, in a similar way as discussed hereinabove.

In some embodiments, the angle change of the remote control device in at least one dimension can be used to control a moving velocity of the carried object in the corresponding dimension. For instance, the moving velocity of the carried object in a dimension can have a predetermined proportional relation with angle changes of the remote control device in a corresponding dimension.

In some embodiments, the method of controlling can further comprise a process S103.

In process S103, a spatial attitude of the unmanned apparatus and a spatial attitude of the carried object can be respectively measured by an unmanned apparatus attitude sensor and a carried object attitude sensor carried by the unmanned apparatus, spatial attitude signals for controlling the unmanned apparatus and the carried object can be generated, and the unmanned apparatus and the carried object can be maintained in a desired state based on the spatial attitude signals.

In some embodiments, the method of controlling can further comprise a process S104.

In process S104, a control of the remote control device over the carried object can be turned on or turned off by controlling the attitude sensor and/or the microprocessor of the remote control device with a control switch provided on the remote control device.

The control switch can be turned on to activate a control of the remote control device over the carried object when the control is needed, and can be turned off to deactivate a control of the remote control device over the carried object when the control is not no longer needed. When the control switch turns off a control of the remote control device over the carried object, the carried object can be maintained at a state of a time immediately before the control switch turns off the control of the remote control device. It will be appreciated that, if the control switch turns off the control of the remote control device over the carried object, the carried object can return to its initial state.

It will be appreciated that, the reference numbers of the discussed processes S101, S102, S103 and S104 are assigned merely to distinguish these processes, with no intent to imply an order of performing the processes. It will be appreciated that, these processes can be performed in a different sequence or even simultaneously.

The remote control device, the control system and the method of controlling of the present disclosure can be appreciated from above description of embodiments. An angle change of the remote control device in at least one dimension can be calculated by sensing a spatial attitude of the remote control device, and a carried object control signal for controlling a movement of the carried object carried by the unmanned apparatus in a corresponding dimension can be generated based on the angle change of the remote control device. An unmanned apparatus control signal for controlling the unmanned apparatus can be generated based on a movement of the joystick. With the remote control device of present disclosure, one person can simultaneously control a movement of the unmanned apparatus in four dimensions and a movement of the carried object in three dimensions. A complexity in controlling the unmanned apparatus and the carried object can be decreased, and a controlling efficiency and controlling effect can be improved.

The foregoing description is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A remote control device for remotely controlling an unmanned apparatus and a carried object carried by the unmanned apparatus, the remote control device comprising:
    a remote control device attitude sensor configured to detect a remote control device spatial attitude of the remote control device and output a remote control device spatial attitude signal according to the remote control device spatial attitude; and
    a microprocessor configured to:
        receive the remote control device spatial attitude signal, calculate an angle change of the remote control device in a remote control device dimension based on the remote control device spatial attitude signal, and
        generate a carried object control signal for controlling a movement of the carried object in a corresponding dimension based on the angle change of the remote control device, the corresponding dimension corresponding to the remote control device dimension.

2. The remote control device of claim 1, wherein the carried object control signal is configured to control the carried object to move a predetermined angle in the corresponding dimension or to move at a predetermined velocity in the corresponding dimension.

3. The remote control device of claim 1, wherein the remote control device spatial attitude of the remote control device includes at least one of an angle of the remote control device in a yaw direction, an angle of the remote control device in a pitch direction, or an angle of the remote control device in a roll direction.

4. The remote control device of claim 1, wherein the carried object control signal is configured to control a movement of the carried object such that an angle change of the carried object in the corresponding dimension is proportional to the angle change of the remote control device in the remote control device dimension.

5. The remote control device of claim 1, further comprising:
    a joystick,
    wherein the microprocessor is further configured to generate, based on a movement of the joystick in a control direction, an unmanned apparatus control signal for controlling a movement of the unmanned apparatus in a corresponding direction, the corresponding direction corresponding to the control direction.

6. The remote control device of claim 5, wherein the unmanned apparatus control signal is further configured to control the unmanned apparatus to maintain a state in the corresponding direction when the joystick is maintained at a predetermined position in the control direction.

7. The remote control device of claim 6, wherein the unmanned apparatus control signal is further configured to control the unmanned apparatus to maintain an original moving velocity in the corresponding direction or to decelerate and enter into a hovering state.

8. The remote control device of claim 1, further comprising:
    a control switch configured to control at least one of the remote control device attitude sensor or the microprocessor to activate or deactivate a control of the remote control device over the carried object.

9. The remote control device of claim 1, wherein:
    the remote control device spatial attitude signal is a subsequent remote control device spatial attitude signal output from the remote control device attitude sensor after a control of the remote control device over the carried object is activated, and
    the microprocessor is further configured to:
        record an initial remote control device spatial attitude signal when the control of the remote control device over the carried object is activated, and
        calculate the angle change of the remote control device by comparing the subsequent remote control device spatial attitude signal with the initial remote control device spatial attitude signal.

10. A control system for controlling a movement of an unmanned apparatus and a carried object carried by the unmanned apparatus, the control system comprising:
    a remote control device of claim 1;
    an unmanned apparatus attitude sensor carried by the unmanned apparatus and configured to detect an unmanned apparatus spatial attitude of the unmanned apparatus and generate an unmanned apparatus spatial attitude signal according to the unmanned apparatus spatial attitude for controlling the unmanned apparatus;
    a carried object attitude sensor carried by the unmanned apparatus and configured to detect a carried object spatial attitude of the carried object and generate a carried object spatial attitude signal according to the carried object spatial attitude for controlling the carried object;
    an unmanned apparatus controller carried by the unmanned apparatus and configured to control a movement of the unmanned apparatus based on an unmanned apparatus control signal generated by the remote control device for controlling a movement of the unmanned apparatus and the unmanned apparatus spatial attitude signal; and
    a carried object controller carried by the unmanned apparatus and configured to control a movement of the carried object based on the carried object control signal and the carried object spatial attitude signal.

11. The control system of claim 10, further comprising:
    an unmanned apparatus manipulating interface configured to drive the unmanned apparatus to perform a movement adjustment,
    wherein the unmanned apparatus controller, the unmanned apparatus attitude sensor, and the unmanned apparatus manipulating interface form a feedback closed-loop for maintaining a state of the unmanned apparatus.

12. A method for controlling an unmanned apparatus and a carried object carried by the unmanned apparatus, the method comprising:
    receiving an unmanned apparatus control signal generated by a microprocessor of a remote control device based on a movement of a joystick in a control direction;
    controlling a movement of the unmanned apparatus in a corresponding direction based on the unmanned apparatus control signal, the corresponding direction corresponding to the control direction;
    detecting a remote control device spatial attitude of the remote control device by a remote control device attitude sensor of the remote control device and outputting a remote control device spatial attitude signal according to the remote control device spatial attitude;

calculating, by the microprocessor, an angle change of the remote control device in a remote control device dimension based on the remote control device spatial attitude signal;

generating a carried object control signal based on the angle change; and controlling a movement of the carried object in a corresponding dimension based on the carried object control signal, the corresponding dimension corresponding to the remote control device dimension.

13. The method of controlling of claim 12, wherein controlling the movement of the carried object in the corresponding dimension includes controlling the carried object to move a predetermined angle in the corresponding dimension or controlling the carried object to move at a predetermined velocity in the corresponding dimension.

14. The method of controlling of claim 12, wherein detecting the remote control device spatial attitude includes detecting at least one of an angle of the remote control device in a yaw direction, an angle of the remote control device in a pitch direction, or an angle of the remote control device in a roll direction.

15. The method of controlling of claim 12, wherein controlling the movement of the carried object includes controlling the carried object such that an angle change of the carried object in the corresponding dimension is proportional to the angle change of the remote control device in the remote control device dimension.

16. The method of controlling of claim 12, further comprising:

controlling the unmanned apparatus to maintain a state in the corresponding direction when the joystick is maintained at a predetermined position in the control direction.

17. The method of controlling of claim 16, wherein maintaining the state includes controlling the unmanned apparatus to maintain an original moving velocity in the corresponding direction or to decelerate and enter into a hovering state.

18. The method of controlling of claim 12, further comprising:

controlling, by a control switch of the remote control device, at least one of the remote control device attitude sensor or the microprocessor of the remote control device to activate or deactivate a control of the remote control device over the carried object.

* * * * *